United States Patent [19]

Fors

[11] 3,998,343
[45] Dec. 21, 1976

[54] CARGO MOVING APPARATUS FOR TRUCKS

[76] Inventor: Vernen E. Fors, 7708 Upton Ave. South, Richfield, Minn. 55423

[22] Filed: Dec. 30, 1974

[21] Appl. No.: 537,605

[52] U.S. Cl. ............................ 214/518; 198/855; 214/75 T; 214/83.22; 214/83.34
[51] Int. Cl.² .................................... B60P 1/38
[58] Field of Search ........... 214/75 T, 77 P, 83.18, 214/83.22, 83.24, 83.26, 83.34, 83.36, 518, 519, 83.14; 198/184, 202, 203

[56] References Cited

UNITED STATES PATENTS

| | | | |
|---|---|---|---|
| 1,444,604 | 2/1923 | Haney | 214/85 X |
| 1,704,841 | 3/1929 | Sacerdote | 214/83.26 |
| 1,843,208 | 2/1932 | Cutler | 198/184 |
| 2,352,129 | 6/1944 | Shonnard | 214/83.26 |
| 2,359,889 | 10/1944 | Bigelow | 214/83.36 |
| 2,680,529 | 6/1954 | Narvestad et al. | 214/77 P |
| 3,342,354 | 9/1967 | Behr | 214/83.22 |
| 3,406,849 | 10/1968 | Warren | 214/83.26 |
| 3,493,979 | 2/1970 | Koll et al. | 214/83.26 X |
| 3,575,309 | 4/1971 | Peterson | 214/75 T X |
| 3,704,798 | 12/1972 | Carpenture, Jr. et al. | 214/83.22 X |

Primary Examiner—L. J. Paperner
Attorney, Agent, or Firm—Williamson, Bains & Moore

[57] ABSTRACT

A truck trailer has a movable load-supporting floor including a conveyor belt for fore and aft movement of cargo along the truck trailer, permitting cargo to be loaded into or unloaded from the trailer with minimal expenditure of human labor. The conveyor utilizes a pair of rigid, elongated members positioned along the sidewalls of the truck, spaced from one another, and generally parallel to one another. A plurality of elongated parallel rollers are closely spaced to one another and have their ends rotatably mounted to the elongated members, permitting rotation of the rollers about their longitudinal axes. The conveyor belt is supported by the rollers and mounted thereon for fore and aft movement along the trailer as the rollers rotate about their axes. Sprockets are fixed to the ends of each individual roller. A pair of endless chains extends along the lateral sides of the belt and engages the sprockets at each end of the rollers to rotate the rollers. The conveyor belt is fixed to the endless chains at both lateral sides of the belt to positively drive the belt in response to chain movement, and the rigid rollers support the load within the trailer. A generally upright barrier is fixed to the belt and to the chains to move forwardly and rearwardly with the conveyor belt and provides support to cargo adjacent the barrier. A pair of tracks is mounted to the sidewalls and supports and guides idler wheels on the barrier. The cargo moving apparatus may be installed as original truck equipment or added as an accessory to already existing trucks.

The truck trailer may also be provided with a swingable tailgate having a cargo carrying conveyor belt confronting the conveyor belt of the truck trailer, and when placed in a rearwardly extending, horizontal orientation provides a loading deck at the rear cargo entrance of the truck trailer. A loading bar is mounted across the cargo entrance for upward and downward movement to control the tipping of cargo entering or leaving the conveyor belt and also to protect the conveyor belt from collision damage.

13 Claims, 11 Drawing Figures

CARGO MOVING APPARATUS FOR TRUCKS

BACKGROUND OF THE INVENTION

A steadily increasing volume of cargo is transported by truck trailer and must be loaded into the trailer at origin, unloaded from the trailer at freight terminals, and then sometimes reloaded on a local delivery truck and subsequently unloaded at its final destination point. Where possible, cargo is placed on pallets which are carried by front-end loaders into and out of the truck trailers. While such loading is relatively fast, it possesses a notable risk factor for the operator and others who must operate the loader in narrow, often poorly lighted trailers in close proximity to heavy objects which can easily fall or tip within the trailer. When the cargo is of a type impossible to handle with a front-end loader or one which is not easily shipped on pallets, the cargo must be loaded on the trailer by hand labor. In any event, the cargo is always transferred from the loading dock to the trailer starting with the loading of the front end of the trailer and progressing rearwardly until the trailer has been filled to the doors at the rear cargo entrance, a distance of up to 50 feet. If loading by hand, a laborer must make many trips back and forth along the 50-foot trailer before it is filled to capacity. It has been estimated that six men can work for approximately six hours to completely load a 50-foot, over-the-road truck trailer, and such loading is very tedious for the cargo handlers and understandably expensive for the trucking companies.

Even if hand loading and unloading can be avoided and front-end loaders carry the cargo into and out of the trailers, a high element of risk is present when a 5,000-pound front-end loader enters the truck van carrying an additional load of several thousand pounds. An operator may not know until it is too late whether the truck flooring will hold the combined weight of the front-end loader and cargo, and any tipping or overturning of the heavily loaded loader in the narrow confines of the often darkened and crowded van interior can be extremely perilous. Often the driver of the front-end loader is assisted by a second worker who leads the front-end loader to inspect the necessary clearances and light the way while directing the driver of the loader. Accidents in which the lead workman is pinned against cargo or sidewalls or where cargo falls on him are not unusual, and accordingly it is desirable to be able to load such trailers without driving the front-end loaders into the trailer.

When cargo is unloaded from the truck trailer at freight terminals or at the final destination point, the unloading of the trailer presents the same dangers and difficulties as those described for loading. With large and heavy loads, many men or heavy equipment may be required to unload the trailer and many man-hours consumed while the expensive truck trailer remains idle and unable to continue its delivery missions until a substantial part of the load has been removed.

It would be desirable to provide a truck trailer which can be easily loaded and unloaded without requiring a front-end loader to drive within the truck or that workmen repeatedly walk the length of the van to pick up and deposit their loads. Additionally, it would be desirable to reduce the number of man-hours required to fully load and unload a van. The present invention is readily adapted to over-the-road trailers or to local delivery trucks of many sizes and provides a solution to the described problems, eliminating the need for either men or front-end loader vehicles to enter the truck for either loading or unloading the cargo.

SUMMARY OF THE INVENTION

The invention relates to the field of truck trailer equipment and utilizes a movable load-supporting floor within the truck for loading and unloading cargo into and out of the trailer.

Two rigid, elongated, generally parallel members are spaced from one another and positioned within the trailer such that one of the members is adjacent each lateral sidewall of the truck trailer. A plurality of rigid, elongated rollers are carried by the elongated members and mounted therebetween for rotation about the longitudinal axes of the rollers with each roller's axis being generally perpendicular to the elongated members. A conveyor belt is supported on the rollers for movement in fore and aft directions along the trailer as the rollers rotate about their axes, and the elongated members, plurality of rollers, and conveyor belt collectively cooperate to define a load-supporting floor for the truck trailer. Drive means is provided to move the conveyor belt in fore and aft directions along the truck trailer to thereby load and unload cargo, respectively.

A generally upright, rigid barrier extends upwardly from the load-supporting floor and may be fixed to the conveyor belt to move therewith, permitting the barrier to move along the truck trailer to provide support to the cargo adjacent the barrier.

Preferably, the rollers are provided with sprockets at each end thereof and a pair of endless chains extends along the elongated members, one chain engaging the sprockets at one end of the rollers and the remaining chain engaging the sprockets at the opposite ends of the rollers to thereby drive the rollers from both ends thereof. A reversible, electric motor may be coupled to one or more of the rollers to thereby drive the plurality of rollers through the pair of endless chains.

The movable conveyor belt is supported by the rollers and may be rigidly fixed to the endless chain at both lateral sides of the conveyor belt to assure positive driving of the belt in response to movement of the chain. The rotatably mounted rollers provide the load support needed to accommodate heavy loads resting on the conveyor belt.

The invention may be used with equal facility in detachable, over-the-road type truck trailers or in the smaller truck trailers used for local deliveries and attached permanently to the truck cab. When used on local delivery type trucks, it is desirable that the rear of the truck be provided with a loading deck extending approximately four feet or more from the rear of the truck. This deck is important to permit the operator to stand thereon while raising the overhead door used at the rear of such trucks and to permit him to manipulate the load within the truck. The invention includes a tailgate which is provided with its own independent conveyor belt supported by rollers, the conveyor belt being adjacent and confronting the load-supporting floor already described as within the truck trailer. Accordingly, cargo being loaded into and out of the truck body will pass over the conveyor belt of the tailgate, which is provided with a power drive system to carry the cargo therealong. Means are provided to raise and lower the tailgate between an open or unloading position, in which it serves as a loading deck or ramp, and a closed position, where the door is swung upwardly against the cargo entrance of the truck to fully or partially block the entrance.

A second solution to the providing of a loading deck at the rear of a local delivery truck is to slidably mount the load-supporting floor relative to the truck trailer, permitting the load-supporting floor to be moved rearwardly out the rear entry of the truck a predetermined distance, thereby creating a loading deck at the rear of the truck. This can be accomplished by a rack and pinion gear system between the trailer body and the load-supporting floor, the system being driven by an electric or hydraulic motor.

A loading bar is provided at the rearmost portion of the truck trailer and is adjacent the rearmost end of the load-supporting floor. In the event and a tailgate is used, the loading bar is positioned at the rearmost end of the tailgate. This load-supporting bar is movably mounted to the elongated members of the load-supporting floor, or alternatively to the side beams of the tailgate, as the case may be, for upward and downward movement selectively controlled by the operator. This upward and downward movement permits the cargo to be supported at the rearmost end of the trailer or tailgate and the rearward tipping of cargo onto a dock or dolly to be carefully controlled.

The cargo moving apparatus permits workers to bring cargo directly to the rear cargo entrance of the truck and place the cargo on the conveyor belt within the truck and adjacent the entrance and, for example, completely fill the first 4 feet of cargo space adjacent the entrance. The operator then actuates the conveyor belt to move the load inwardly forwardly along the van for a distance of approximately 4 feet, providing 4 additional feet at the rear of the trailer which may next be fully loaded, and this operation is repeated until the trailer is fully loaded. The described loading steps eliminate the need for the workers to repeatedly walk a substantial length of the van to load the van from its foremost end and then work rearwardly and accordingly saves much walking and carrying and reduces loading and unloading time. Additionally, a front-end loader will be able to deposit its load at the rear cargo entrance of the van directly on the conveyor belt. The load can then be carried forward along the trailer by the belt, eliminating the need for the front-end loader to enter the vehicle and eliminating the dangers to workers and to truck floor which now accompany use of a heavy loader in the narrow confines of a truck trailer. Cargo need only be partially placed on the conveyor belt, and still the belt will easily carry the load into the van, thus eliminating much manual labor, permitting more rapid loading and reducing handling costs.

Unloading of the van is also made substantially easier by the invention. Where in the past three or more men would be required to unload a heavily loaded van, one or two men can now accomplish the same task with the aid of the cargo moving apparatus, which can move cargo rearwardly out of the trailer as easily as it loads the trailer.

The invention is extremely reliable, long lasting, and can eliminate countless man-hours of loading and unloading work, thereby promoting faster freight loading and delivery services and reduced loading and unloading expense. The rapid loading and unloading frees the truck trailer for additional service and permits a truck owner to realize greater return on his investment. These and other advantages will appear from the detailed description of the invention and the appended drawings.

DESCRIPTION OF THE PREFERRED EMBODIMENTS

Figures 1, 6, 7:
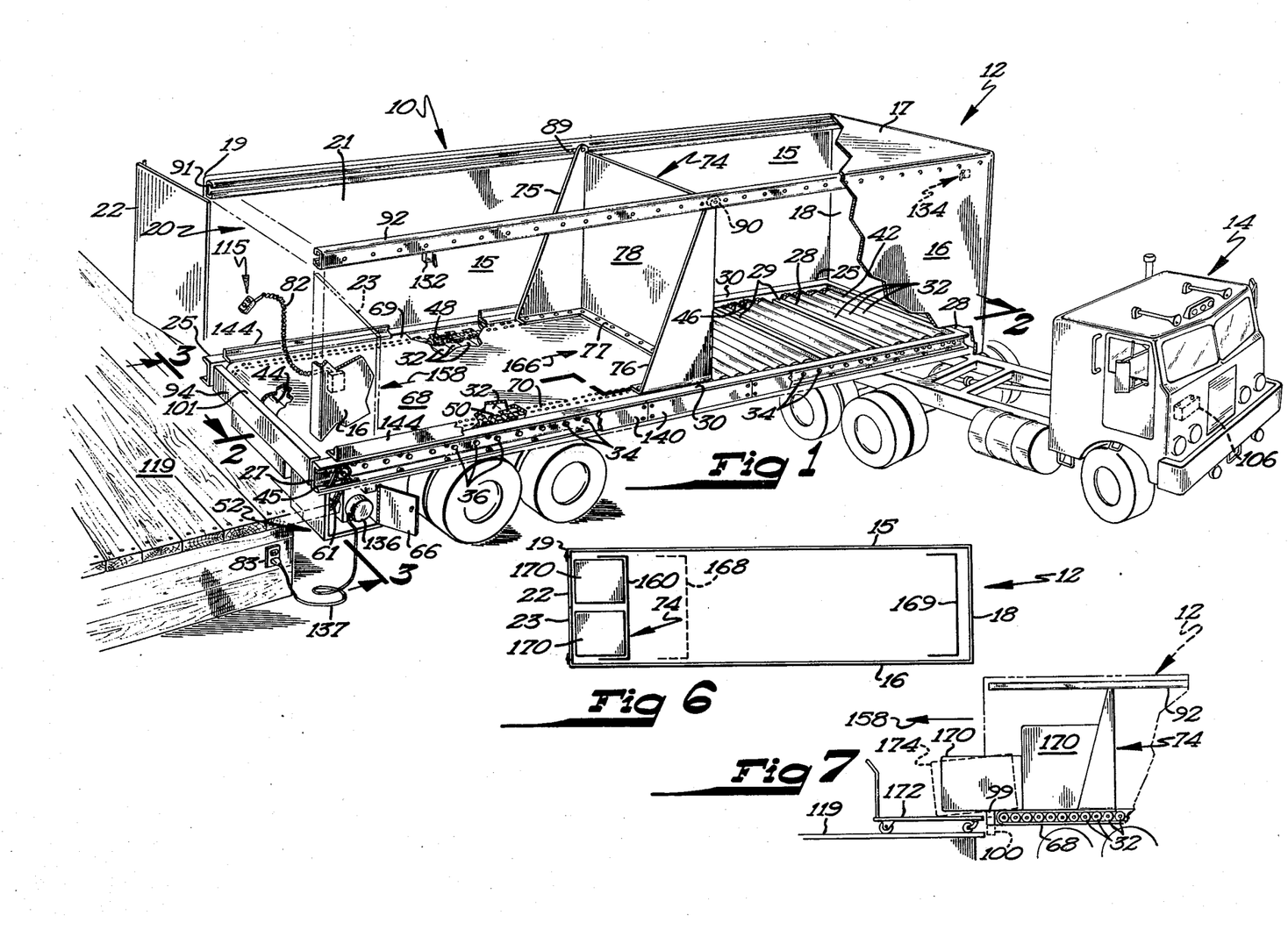
FIG. 1 is a perspective view of an over-the-road truck trailer with the trailer partially cut away to show a first embodiment of the cargo moving invention.
FIG. 6 is a top elevation view of the trailer showig alternative positions of the upright barrier and demonstrating the operation of the invention.
FIG. 7 is a side view of the rear of the truck trailer of FIG. 1 showing the unloading of cargo from the trailer using the loading bar.
Figure 2:
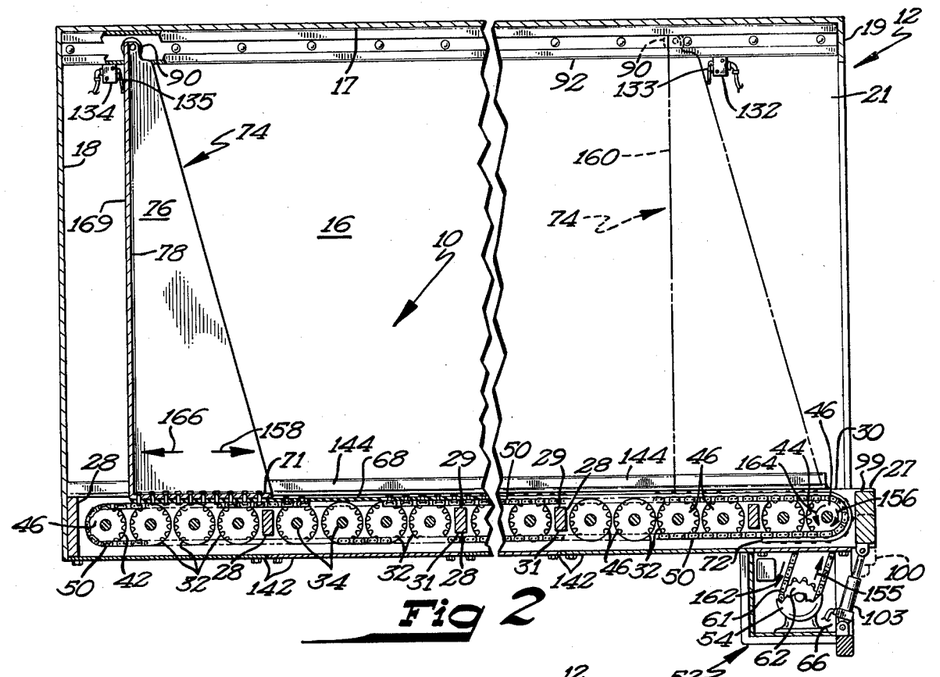
FIG. 2 is a side elevation view of the truck trailer of FIG. 1 taken in the direction of cutting plane 2—2 with an intermediate portion of the truck body not shown.

Referring now to FIGS. 1 and 2, a truck trailer 12 has a cargo moving apparatus 10 embodying the invention and attached to a tractor unit 14. The term trailer, as used herein, is intended to encompass any type of van or platform for carrying of cargo whether or not detachable from the power unit 14. Accordingly, the term trailer encompasses the cargo carrying portion of both over-the-road and local delivery type truck vehicles and is not limited as to the size or cargo capacity of the truck.

The trailer 12 is provided with a pair of upright, lateral, generally parallel sidewalls 15 and 16, and the trailer 12 may be provided with a roof 17 interconnecting the sides 15 and 16. The front of the trailer is closed by front wall 18, and at the rear 19 a cargo loading entrance 20 provides an opening through which cargo may be loaded into or out of the interior 21 of the trailer. At the sides of the entrance 20 are swinging doors 22 and 23 which swing to close the entrance 20 to make the interior 21 substantially weather-tight.

The embodiment 10 of the cargo moving apparatus has a pair of rigid, elongated generally parallel members 25 and 27 which are formed of rigid steel beams and between which extend a plurality of spaced struts 28 whose ends are rigidly fixed to the members 25 and 27. Typically the struts 28 are spaced at three- or four-foot intervals along the length of the truck trailer 12 and are perpendicular to the members 25 and 27, with the uppermost surface 29 of each strut being at a lower elevation than the upper surfaces 30 of the members 25 and 27 for reasons that will be described hereafter. The sidewalls 15 and 16, as well as the front wall 18, may be supported or carried on the members 25 and 27 or may be carried by other frame members of the truck (not shown) in any manner known to the art.

Figure 3:
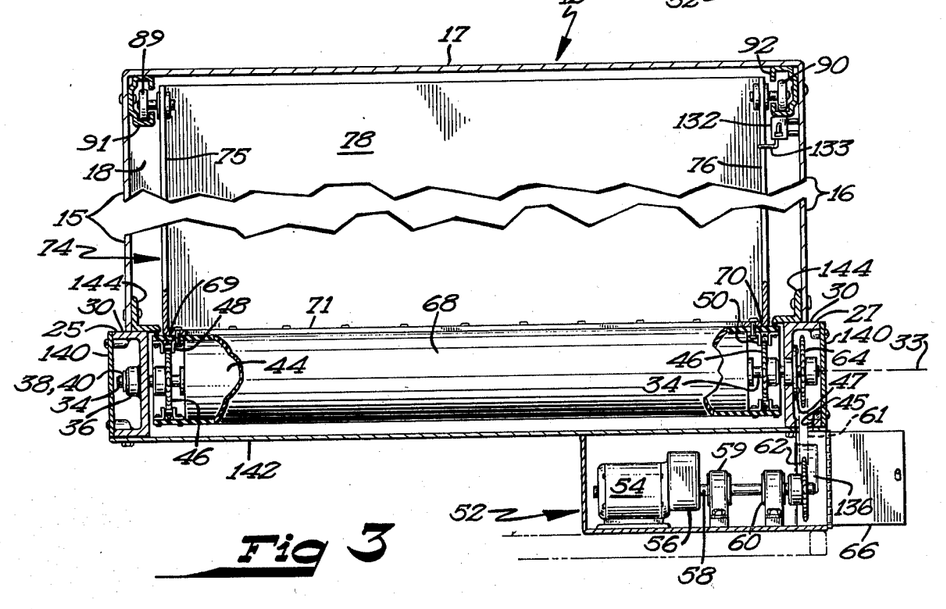
FIG. 3 is a rear cross-sectional view of a drive means used with the invention and taken in the direction of cutting plane 3—3 of FIG. 1.

A plurality of rigid, elongated, heavy-duty rollers 32 are positioned between the members 25 and 27 with the longitudinal axis 33 of each roller 32 being generally perpendicular to the members 25 and 27 and parallel to the axes of the remaining rollers 32. The rollers selected should be capable of withstanding the anticipated load to be carried by cargo likely to be placed on them, and it is preferred that rollers having an approximate diameter of 4 inches be used, with the rollers being spaced from one another by approximately an inch or less. The rollers 32 are contained wholly between the members 25 and 27 and at intervals along the length of the truck a pair of adjacent rollers is spaced apart sufficiently to accommodate a strut 28, extending between the members 25 and 27. The outer periphery of the individual rollers 32 is positioned at a level higher than the surface 29 of the struts 28, so that a conveyor belt carried by the rollers 32 will pass smoothly over the struts 28, as will be described further hereafter. Each roller 32 has a shaft 34 extending along the longitudinal axis 33 of the roller 32 and rotatably mounted in sockets or bearings 36 (FIG. 3) on the members 25 and 27. As best shown in FIGS. 1 and 3 the shafts 34 of the rollers 32 extend through the members 25 and 27 and are provided with a washer and pin 38 and 40, respectively, to retain the roller 32 between the members 25 and 27. As best shown in FIGS. 1 and 2, the rollers 32 extend substantially the length of the trailer 12 with front and rear terminal rollers 42 and 44, respectively, which are identical in construction to the remaining rollers 32 except that the shaft 34 of roller 44 extends outwardly through flange bearing 47 and carries a sprocket 64 fixed to the shaft and on the outer side of member 27.

On the shaft 34, which extends from each end of the rollers 32, a sprocket 46 is rigidly fixed to the shaft. All of the sprockets 46 immediately adjacent member 25 are aligned in a generally straight line to permit an endless chain 48 to drivingly engage all sprockets 46 adjacent member 25. Similarly, all of the sprockets 46 adjacent the member 27 are also aligned in a straight line to permit their engagement by an endless chain 50. The endless chains 48 and 50 extend substantially the entire length of the trailer between the sprockets 46 on front and rear terminal rollers 42 and 44, the chains being tightly secured thereabout so as to firmly engage the teeth of all sprockets 46 along the chains. Movement of chains 48 and 50 causes rotation of all of the rollers 32, 42 and 44 about their longitudinal axes 33. As best seen in FIG. 2, the chains 48 and 50 pass cleanly over and under the struts 28 without contacting the struts, since the upper surfaces 29 of the struts are positioned below the uppermost edge of the sprockets 46. The lowermost surface 31 of the struts terminates at a level above the chains and accordingly does not interfere with chain movement.

At the rear 19 of the truck, a drive box 52 is hung below the roller 44 (FIG. 3) and houses a reversible electric motor 54 connected to a gear train and clutch 56. The output shaft 58 from the gear train is journaled in pillow block bearings 59 and 60, the end of the shaft 58 carrying a sprocket 62 which is fixed to the shaft to rotate therewith. Accordingly, when the motor 54 is energized, the shaft 58 and sprocket 62 rotate in the bearings 59 and 60. An endless chain 61 extends about the sprocket 62 and about drive sprocket 64, which is fixed to the shaft 34 of rear terminal roller 44, the chain passing through a slot 45 in the member 27. Thus, rotation of the motor 54 moves the chain 61 and drives the sprocket 64 on roller 44. As the roller 44 rotates in response to turning of drive sprocket 64, motion is transmitted from the sprockets 46 at each end of roller 44 to the chains 48 and 50, which drive all other rollers 32 and 42 along the length of the truck trailer.

A swingable drive box cover 66 is provided to permit servicing of the motor 54.

A heavy-duty conveyor belt 68 (FIGS. 1 and 2) extends approximately half way around the circumference of the endless chains 48 and 50 and is rigidly attached by riveting or other known means to the chains along its lateral edges 69 and 70. The conveyor belt 68 is made of heavy flexible material which is relatively impervious to the sharp edges and heavy loads likely to be encountered during truck travel, and has an end 71 adjacent the front of the van and the remaining end 72 at the rear of the van but on the underside of the rollers 32. Accordingly, the conveyor belt 68 is firmly supported on the rollers 32, 42 and 44 throughout the length of the trailer 12, and due to the rotatable mounting of each roller the conveyor belt slides freely along the top of the rollers when pulled in fore or aft directions 166 and 158, respectively, by movement of the chains 48 and 50.

The conveyor belt 68, the plurality of rollers 32, 42 and 44, and the elongated members 25 and 27 which support the rollers collectively define a load-supporting floor for the trailer 12.

The sprockets 46 positioned at each end of the rollers 32, along with the sprockets 46 of rollers 42 and 44, the motor 54, shaft 58, sprocket 62, and chains 61, 48 and 50 collectively comprise one type of drive means operatively drivingly connected with the load-supporting floor to move the conveyor belt 68 along the rollers to carry cargo fore and aft along the trailer. While the drive means has been shown as including sprockets on the ends of each roller 32 in the trailer, it should be understood that it is not essential that each roller be provided with a sprocket and positively driven by the chain and that a lesser number of rollers can be used to deliver power to the belt. It should be understood that while a reversible electric motor has been shown as the prime mover for the chains, other types of electric or hydraulic motors may be substituted and are within the purview of the invention.

Referring now to FIGS. 1 and 2, a generally upright, rigid barrier 74 has main wall 78 which is generally perpendicular to sidewalls 15 and 16, side supports 75 and 76 and a base 77, the base 77 being rigidly attached to the belt 68 and also preferably to the endless chains 48 and 50 so the barrier 74 is positively pulled by movement of the chains 48 and 50.

At the upper end of barrier main wall 78 at opposite lateral sides thereof, idler guide wheels 89 and 90 are mounted to the wall 78 for rotation about a generally horizontal axis. A track 91 extends substantially the length of the trailer 12 and receives the wheel 89 therein for free rotation along the track 91 as the barrier 74 moves fore and aft along the trailer. A second track 92 also extends fore and aft along the trailer and receives rotatably mounted idler wheel 90 therein, permitting it to roll freely along the track 92 while the barrier 74 moves along the trailer. The shown idler wheels 89 and 90 rotatably mounted to the barrier, along with the tracks 91 and 92, collectively comprise guide means extending between the barrier and the sidewalls to guide and support the barrier 74 as the barrier moves relative to the sidewalls. The tracks 91 and 92 may be attached to the sidewalls or roof of the trailer in any manner known to the art.

Figures 4, 5B:
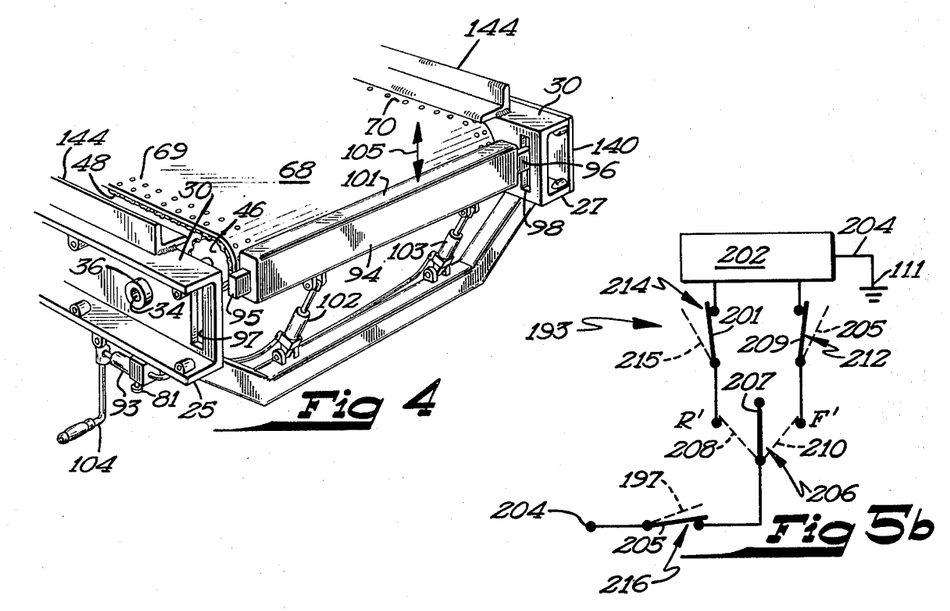
FIG. 4 is a rear perspective view, partially exploded, of a loading bar at the rear of the truck trailer of FIG. 1.
FIG. 5b is a schematic circuit diagram of an electrical system connectable to the system shown in 5a and usable with another embodiment of the invention.

Referring now to FIG. 4, a cargo loading bar 94 is formed of rigid material such as steel, and has projecting fingers 95 and 96 at the ends thereof. The fingers 95 and 96 are slidably received in slots 97 and 98 of elongated members 25 and 27, respectively. The bar 94 is thus upwardly and downwardly movable in directions 105 along slots 98 and 97 from a raised position 99 (FIG. 2) to a lowered position 100. In the raised position 99, the upper surface 101 is substantially even with the upper, generally horizontal surface of the conveyor belt 68 so that a crate or box moving rearwardly on the conveyor belt 68 will rest flushly on the surface 101 and receive support by the bar 94 when the bar is in a raised position 99.

A pair of hydraulic or pneumatic cylinders 102 and 103 is attached between the truck frame and the bar 94 to be actuated from a master cylinder 93. To raise the bar 94 with cylinders 102 and 103, an operator pumps handle 104 to increase pressure in master cylinder 93. A bleed valve 81 is actuated to release pressure in cylinder 93 to move the bar 94 from raised position 99 to lowered position 100. When a crate or box has been moved rearwardly on the conveyor belt 68 until it is balanced on the bar 94, downward movement of the bar 94 can cause the crate to tip rearwardly onto a dock or cart, and the rate of tipping is easily controlled by the operator, who manipulates the movement of the bar 94 in a downward direction by using the bleed valve 81. The interconnected cylinders 102, 103 and 93 along with the handle 104 and bleed valve 81 collectively comprise one type of loading bar lifting device usable to selectively raise and lower bar 94.

Figure 5A:
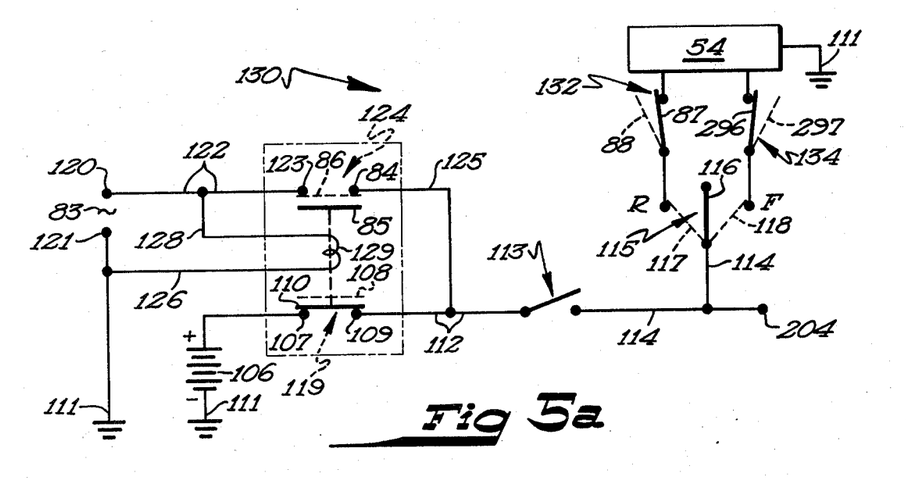
FIG. 5a is a schematic circuit diagram of the electrical system used to energize the embodiment of the invention shown in FIG. 1.

The preferred manner of energizing the conveyor belt 68 is by electric reversible motor 54, which provides a source of rotational energy. Preferably motor 54 has systems capable of running either on battery voltages or on alternating current. Referring now to FIG. 5a which is an electrical schematic diagram, a battery power source 106 is connected between ground 111 and terminal 107 of switch 119, which is in a normally closed position 110 except when moved to an open position 108 as described hereafter.

A conductor 112 extends from terminal 109 of switch 119 to a manually actuated master power switch 113, which would ordinarily be located on the tractor 14. A conductor 114 extends from the switch 113 to a single-pole double-throw switch 115. The switch 115 is normally in the off position 116, during which no electric current is supplied to the electric motor 54 which drives the belt 68. When the switch 115 is moved to position 117 contacting terminal R, the motor 54 is energized in a reverse direction to move the conveyor belt 68 in aft direction 158 to move barrier 74 toward entrance 20. When the switch 115 is moved to position 118 contacting terminal F, the motor 54 is energized in a forward direction to move the conveyor 68 in forward direction 166, carrying barrier 74 toward the cab 14.

The motor 54 has its neutral terminal connected to ground 111. Preferably the switch 115 is mounted at the rear of the truck trailer and is positioned at the end of a detachable, stretchable, coiled cable 82 to permit the operator to hold the switch 115 while standing on the dock 119. Since the operator can hold the switch 115 in his hand, he can stand on the dock 119 and manipulate cargo fore and aft while simultaneously physically handling the cargo or moving a dolly to receive the cargo from the trailer.

Because much loading and unloading of the trailer 12 will occur at freight terminals, it is desirable to be able to energize the motor 54 with standard alternating current voltages. Accordingly, terminals 120 and 121 may be connected to a source 83 of AC voltage. The magnitude of the voltage should be selected or modified in accordance with the specifications of the motor 54, and accordingly the voltage across terminals 120 and 121 may be 110 volts or a lower value, depending upon the specifications of the motor 54. Terminal 121 is connected to ground 111. Terminal 120 is connected through conductor 122 to terminal 123 of switch 124, which has its terminal 84 connected by conductor 125 to conductor 112. The switch 124 is in normally open position 85 and moves to closed position 86 only when voltage is applied across terminals 120 and 121, as will be described hereafter.

A conductor 128 extends from terminal 120 to solenoid coil 129, which in turn is connected through conductor 126 to ground 111. The solenoid coil 129 is thus connected across the terminals 120 and 121 to be energized when alternating current is applied to the terminals 120 and 121. Energizing of the coil 129 simultaneously actuates the switches 119 and 124 which are mechanically, electromechanically or electronically linked to so function. When coil 29 is energized, switch 119 moves from position 110 to position 108 and switch 124 moves from position 85 to position 86. Accordingly, application of an alternating current to terminals 120 and 121 disconnects the conductor 112 from the battery 106 and instead connects conductor 112 to the alternating current source 83. Thus, the electrical system 130 will automatically select alternating current as its power source when a choice between alternating current and battery current is available.

Microswitch 132 is connected between terminal R of switch 115 and the motor 54 and is normally in closed position 87. The switch 132 is positioned along track 92 near the rear of the trailer as best shown in FIGS. 1 and 2 and is closed at all times except when mechanically opened by contact between the barrier side support 76 and an extending switch lever 133. Accordingly, contact between the support 76 and the lever 133 causes the switch 132 to move to open position 88, thereby de-energizing motor 54 and preventing the motor from driving the barrier 74 beyond the position of switch 132. The switch 132 is positioned at a location along the trailer beyond which the barrier 74 should not move and preferably is arranged to cause the power to the motor 54 to be interrupted when the barrier reaches a distance approximately four feet from the entrance 20 of the trailer. An identical microswitch 134 is positioned between terminal F of the switch 115 and the motor 54, the switch 134 being positioned adjacent the forward end of the trailer along track 92 as best shown in FIGS. 1 and 2, and provided with a lever 135 positioned to contact the wall 78 as the barrier moves forwardly toward front wall 18 of the truck. The switch 134 is normally in closed position 296 and is moved to open position 297 only when the lever 135 is moved by contact with the barrier support 76. Accordingly, the switch 134 is positioned at a location beyond which the barrier 74 should not move, and provides an automatic shut-off switch preventing the barrier 74 from being driven into the forward wall 18 and damaging the trailer 12 or the cargo moving apparatus 10.

A retractable reel 136 for carrying a length of electrical power cord 137 is positioned in the box 52 at the rear of the truck to permit the operator to plug the electrical system 130 into the AC source 83 provided at the freight terminal dock 119.

A facing panel or panels 140 may be attached over the otherwise exposed ends of the shafts 34 to prevent contamination by dust and the like. Similarly, a metal facing 142 formed of one or more metal sheets is attached beneath the conveyor belt (FIG. 2) to keep the apparatus 10 cleaner and to permit access for servicing.

Referring now to FIGS. 1–3, an angle iron 144 is attached to the members 25 and 27 or alternatively to the sidewalls 15 and 16 of the truck in any known manner, and extends over the edges 69 and 70 of the conveyor belt 68 to prevent entry of small objects or cargo into the otherwise small gap between the members 25 and 27 and conveyor belt 68.

While the invention 10 as described may be readily installed in a trailer 12 as original equipment or built into an already existing trailer altered in accordance with the teachings herein, it is also possible to install the cargo moving apparatus on the floor of an already existing truck without major changes in the truck floor. The cargo moving apparatus 10 may be built separately from the truck as a kit which includes a fully assembled pair of elongated members 25 and 27 carrying rollers 32, 42, 44, conveyor belt 68 and barrier 74 thereon, the elongated members being slid onto an already existing trailer and secured on the standard floor surface of the trailer. The kit would have a suitable length adapted for the specific truck in which it was to be installed, and a motor box 52 would be installed at the rear of the truck as shown in FIGS. 1–3 and a hole cut through the truck floor to permit the drive chain 61 to be installed between the rear terminal roller 44 and a sprocket 62 connected to the drive motor 54. Additionally, slight alteration may be required at the rear of the trailer to accommodate the cylinders 102 and 103 used to raise and lower the bar 94. Tracks 91 and 92 would be bolted in place along the sidewalls 15 an 16 of the truck to receive the wheels of the barrier 74. The electrical system 130 would also be used with the kit, and operation of the apparatus would be identical to that described hereafter for the embodiment 10.

In operation, when it is desired to load cargo into the trailer 12, the operator manually closes power switch 113 on the tractor 14 and then uses the hand-held switch box 115 located adjacent the trailer entrance 20. With the spring-loaded cord 82 the operator may stand on the dock 119 and operate the switch 115 while observing the trailer interior 21.

The operator, using switch 115, moves the contact from position 116 to position 117 (FIG. 5a), permitting current to flow from the always available battery 106 to and through switch 119 which is in position 110 and along conduit 112 through the closed switch 113 and thence along conductors 114 to switch 115. Switch 115, now in position 117, delivers current from conductor 114 to terminal R and thence through closed switch 132 to motor 54, energizing the motor and returning to ground 111.

If the terminals 120 and 121 are connected across an alternating curent source 83, the current from the AC source flows along conductors 122 and 128, energizes solenoid 129 and returns to ground through conductor 126, causing the switches 119 and 124 to shift from the solid-line positions 85 and 110 to dotted-line positions 108 and 86 to disconnect the battery 106 from conductor 112 and instead connect the AC source to the conductor 112. When the solenoid 129 is energized, alternating current at conductor 112 reaches terminal R of switch 115 by the same route described for the battery current. Accordingly, the solenoid 129 assures that if alternating current is connected to the circuit 130, the circuit will utilize the alternating current instead of the battery 106, thus prolonging battery life.

When the motor 54 is energized in the reverse direction, it begins rotating the shaft 58 and sprocket 62 fixed thereto in direction 155 (FIG. 2). Rotation of sprocket 62 moves chain 61 which in turn causes drive sprocket 64 on roller 44 to rotate in direction 156. Rotation of the sprocket 64 turns the shaft 34 of roller 44, producing rotation of the sprockets 46 located at opposite ends of the roller 44 in the direction of arrow 156.

Rotation of the roller 44 in direction 156 moves chains 48 and 50, causing all the remaining rollers 32 positioned between roller 44 and roller 42 to also rotate in the direction 156. As the rollers 32, 42 and 44 turn in the direction 156, the chains 48 and 50 move in direction 158 (FIG. 2) and carry the attached conveyor belt 68 and barrier 74 rearwardly in direction 158. This rearward movement of the conveyor belt and the upright barrier 74 continues until the switch 115 is opened or barrier support 76 of the barrier 74 contacts lever 133 of cutoff switch 132 causing the switch 132 to swing from closed position 87 to open position 88, thereby de-energizing the motor 54 and preventing further rearward movement of the conveyor belt 68 and barrier 74 in direction 158. The conveyor belt is then positioned in its rearmost position 160 with the wall 78 approximately 4 feet inward from the entrance 20 and the trailer is ready for loading.

With the barrier 74 in its rearmost position 160 (FIG. 2), a worker loads the rearmost four feet of the truck trailer 12 with cargo 170, substantially filling the rearmost four feet of the trailer to the desired height, which may be substantially as high as the roof 17. When the rearmost 4 feet have been fully loaded, the operator actuates the switch 115, swinging the switch from position 116 to closed position 118 to drive the electric motor 54 in a forward direction 162 (FIG. 2). As the motor turns in direction 162, so also does sprocket 62 which moves chain 61, causing the drive sprocket 64 of roller 44 to rotate in direction 164. As a result, the roller 44 turns in direction 164 and moves endless chains 48 and 50 to rotate all the remaining rollers 32 and 42 in direction 164. Accordingly, the conveyor belt 68 moves in the forward direction 166, carrying the barrier 74 toward the front wall 18. The operator permits the barrier 74 to move forwardly for approximately an additional four feet to position 168 (FIG. 6). The moving conveyor belt 68 has then carried all cargo 170 forwardly approximately 4 feet to create an additional four-foot deep opening at the rear of the trailer into which additional cargo may now be loaded.

The operator now fills the newly formed, additional four-foot depth of space at the rear of the trailer with cargo and again actuates the switch 115 to move the conveyor belt 68 and the most recently loaded cargo forwardly in direction 166 toward the front of the trailer to create a further four feet of loading space at the rear entrance 20. Naturally, if more or less than four feet of loading space is required, the operator can move the barrier more or less than this distance to accommodate larger or smaller item or items. It should be noted, however, that by the described loading procedure, the operator conducts all loading at the rear entrance 20 of the trailer and uses the conveyor belt 68 to transport the cargo from the entrance 20 forwardly along and within the trailer and thus avoids carrying cargo within the trailer itself, thereby greatly reducing the amount of time spent walking and carrying the cargo about. Any front-end loaders used on the dock can deposit their loads on the conveyor belt 68 at the entrance 20 and need never venture within the trailer. Eventually the barrier reaches its most forward position 169 where the wall 78 contacts the lever 135 of cutoff switch 134, opening switch 134 and preventing further movement of belt 68 or barrier 74 in forward direction 166.

During movement of the conveyor belt 68 and the carrying of cargo thereon, the load is fully supported on the rigid rollers 32, 44 and 42 and the conveyor belt 68 is positively driven by the attached chains 48 and 50 at each lateral side of the belt, thereby readily and smoothly carrying even the heaviest loads.

While the truck is traveling and the rear doors 22 and 23 are closed, the cargo can be closely confined between the barrier 74 and the rear doors to minimize cargo breakage. After each stop at which the operator delivers cargo, he actuates the switch 115 to move the conveyor belt 68 in rearward direction 158 to bring to the rear entrance 20 the cargo next to be unloaded. This procedure assures that while the truck is traveling, the cargo, whether large or small, is closely confined between the rear doors and the upright barrier 74, thereby minimizing the toppling or falling of boxes and the shaking or rolling of the load, while simultaneously assuring that the cargo next to be discharged is at the very rear of the trailer.

During loading and unloading, the loading bar 94 plays an important and valuable role. To raise the bar 94, the operator actuates lever 104 (FIG. 4), which causes pressure to build in master cylinder 93, which in turn causes extension of the slave cylinders 102 and 103, raising bar 94. To lower bar 94, the operator opens bleed valve 81, reducing pressure in master cylinder 93 and causing cylinders 102 and 103 to retract, resulting in the fingers 95 and 96 of bar 94 sliding downwardly along slots 97 and 98, respectively. By careful manipulation of the lever 104 and bleed valve 81, the bar 94 can be moved upwardly and downwardly to carefully control the rate and extent of tipping of the cargo 170 (FIG. 7). Besides being useful in raising and lowering cargo, the bar 94 also provides protection for the conveyor belt 68 and prevents damage to the belt 68 in the event the trailer 12 should be subjected to a rear-end collision or in the event the rear of the trailer is backed too vigorously against the dock 119.

Referring now to FIG. 7, when cargo 170 is to be unloaded from the trailer 12 onto a cart 172 or onto the dock 119, the operator actuates the switch 115 to move the cargo 170 rearwardly in direction 158 until the cargo extends outwardly, rearwardly from the truck entrance 20 but is still supported by the conveyor belt 68 and also by the loading bar 94 in raised position 99. With the load extending rearwardly from the entrance 20 in cantilever fashion (FIG. 7), the operator positions the cart or dolly 172 under the unsupported, protruding end of the load 170 and then actuates bleed valve 81 of cylinder 93 to lower the bar 94 from raised position 99 to lowered position 100 or alternatively to a position intermediate of positions 99 and 100. As the bar 94 moves downwardly, the support it had previously lent to the cargo 170 is gradually withdrawn, causing the cargo 170 to tip downwardly to position 174 where it is supported by conveyor 68 and cart 172. By blocking or locking the wheels of the cart 172 and again energizing the conveyor belt 68 to move rearwardly in direction 158, the cargo 170 will be pushed onto the cart 172 by means of the moving conveyor belt 68, with little or no effort being expended by the operator.

While the embodiment 10 of the cargo moving apparatus may be used in a wide variety of trucks, for many local delivery type trucks it is helpful that a loading deck extend rearwardly from the rear cargo entrance 20 to define a platform on which an operator may stand to raise and lower the often used sliding overhead door and to give him room to manipulate a load into unloading position on the deck. While a local delivery type of truck may be provided with the shown cargo moving apparatus 10 of the embodiment 10 and still have a rigid deck extending rearwardly from the rear of the truck trailer, it has been found helpful to use the below described embodiments of the invention where a loading deck is necessary for local delivery.

Figures 9, 10:
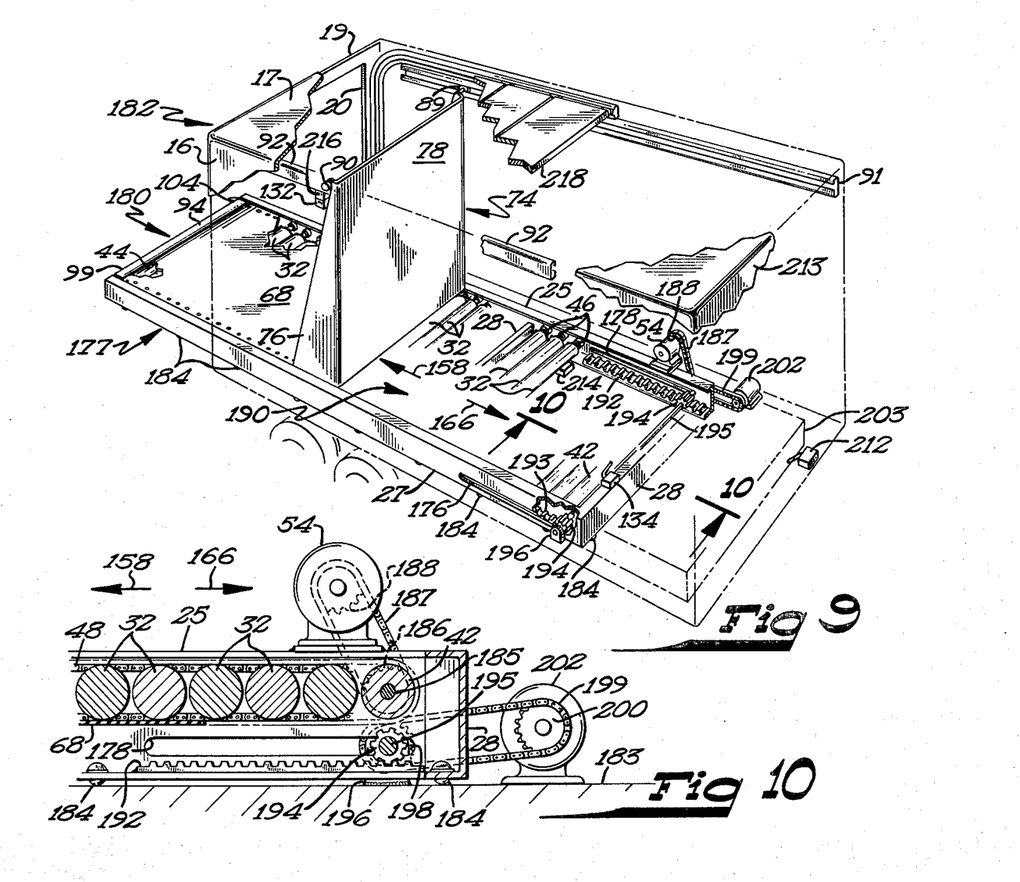
FIG. 9 is a perspective view of another embodiment of the invention in which the load-supporting floor may be moved in and out of the truck trailer to define a rear loading deck for local delivery trucks.
FIG. 10 is a cross-sectional side elevation view of a portion of the embodiment of FIG. 9 taken in the direction of arrows 10—10 of FIG. 9.

Referring now to FIG. 9, a cargo moving apparatus 180, embodying the invention, utilizes a load-supporting floor 190, an upright barrier 74 and a pair of tracks 91 and 92 carried by the sidewalls of the truck trailer 182, all of which are substantially identical to the structures already described in conjunction with embodiment 10 and are numbered accordingly with identical numerals. The embodiment 180 differs from the embodiment 10 in that the elongated members 25 and 27 are supported on a plurality of bearings 184 spaced along the members 25 and 27 to permit forward and rearward movement of the load-supporting floor 190 in directions 166 and 158 along and relative to the floor 183 of the truck trailer 182. The bearings 184 permit the apparatus 10 to be slid relative to the floor 183 of the truck 182 for fore and aft movement in directions 166 and 158, respectively. While bearings 184 provide one type of movable mounting permitting such movement, it should be understood that other structures accomplishing such movement and known to the art may be substituted and are within the purview of the invention. The front terminal roller 42, rather than rear terminal roller 44, has a drive sprocket 186 which is coupled by an endless chain 187 to the sprocket 188 of a reversible electric motor 54, which is substantially identical to the motor 54 described earlier. The motor 54 is fixed to the truck trailer body and drives the roller 42 which is attached to the rollers 32 and 44 by chains 48 and 50 to drive the remaining rollers of the embodiment 180. The motor 54, sprocket 188, chain 187 and drive sprocket 186 replace the motor 54 and its associated sprockets and chains which were located at the rear of the truck trailer on the embodiment 10. Operation of the load-supporting floor 190, in so far as forward and rearward movement of the conveyor belt 68 is concerned, is identical to that already described for the embodiment 10.

Toothed racks 192 and 193 are fixed to the elongated members 25 and 27, respectively, at the forward end of the members and operatively engage pinion gears 194 which are rigidly mounted to shaft 195 for rotation with the shaft. The shaft 195 is supported in bearings 196 and fixed relative to the floor 183 of the truck trailer 182 so that rotation of the shaft 195 and pinion gears 194 will cause the racks 193 and 194 to move forwardly or rearwardly in directions 166 or 158, respectively, to move the load-supporting floor 190 in a forward or rearward direction. The shaft 195 passes through elongated slots 176 and 178 in elongated members 27 and 25, respectively, permitting the members to move forwardly and rearwardly relative to shaft 195 from rearmost positions 177 to forward position 203. The shaft 195 has a drive sprocket 198 fixed thereto, and an endless chain 199 extends between sprocket 198 and a sprocket 200 which is attached to the shaft of reversible electric motor 202 which is fixed to the floor 183 beside and clear of member 25. If desired, the motor 202 may be replaced by other equivalent power means such as an hydraulic motor, and if desired a gear train may be interposed between the chain 199 and the motor 202 to produce faster or slower rotation of the shaft 195. The motor 202, sprocket 200, chain 199, sprocket 198, shaft 195 and the shown racks and pinion gears comprise a means for selectively moving the load-supporting floor 190 along the floor 183 of the trailer. It should be understood that the shown structure is but one such means usable with the invention and that other mechanical systems known to the art may be substituted and are within the purview of the invention. For example, if desired, a mechanical transmission may be provided to drive a rack and pinion system with a single electric motor 54 carried by the load-supporting floor 190.

Referring now to FIG. 5b, the circuit 193 has a contact 204 which is connected to terminal 204 of circuit 130 of FIG. 5a for power. The motor 202 has a ground or neutral wire 204 which is connected to the ground 111 of the circuit 130. A switch 206 is swingable between off, reverse, and forward positions 207, 208 and 210, respectively, to selectively drive the motor 202 in forward and rearward directions. Interposed between the forward terminal F' of the switch 206 and the motor 202 is a cutoff contact switch 212 which is mechanically movable between a closed position 209 and an open position 205. The switch 212 is normally closed and opens only when the floor 190 reaches its most forward position 203 adjacent the wall 213 and contacts switch 212. The cutoff switch 212 thus prevents forward over-travel of the floor 190 and damage to any of the structures. An identical contact switch 214 is positioned between the terminal R' and the motor 202 and remains in the normally closed position 201 until floor 190 reaches its rearward position 177. When the floor 190 reaches position 177 it contacts the switch 214, causing it to move to open position 215 to prevent the driving of the floor 190 any farther rearwardly.

Another contact switch 216 is positioned along the track 92 to prevent rearward over-travel of the floor 190 which would force barrier 74 off the rearward ends of its tracks 91 and 92. The switch 216 is in a normally closed position 205, and opens only when the barrier 74 physically contacts it and swings it to an open position 197, thereby preventing further movement of the floor 190 relative to the truck floor 183 until the barrier has been driven further forward by motor 54.

With the embodiment 180 the circuit 130 of FIG. 5a is used to energize the motor 54 and control forward and rearward movement of conveyor belt 68. It is desirable when using the circuit 130 with the embodiment 180 to physically reposition the cutoff switch 134 from the track 91 to the forward strut 28, as shown in FIG. 9, to prevent forward over-travel of barrier 74 when the floor 190 is in its rearmost position 177.

In operation, the operator actuates the control switch 206, which is preferably located in the cab of the truck, after having first opened the rear door 218, moving the switch 206 to a reverse position 208. Current flows from the power source, which may be either battery 1 106 or the alternating current source 83 of the freight terminal, along conductor 114 to terminal 204 and on to switch 216, which is normally closed unless mechanically opened by the barrier 74 being in an extreme rearward position. Current flows through switch 216 and through switch 206, which is in position 208, reaching terminal R' of switch 206. From terminal R' the current flows through normally closed switch 214 to the reversible electric motor 202. When motor 202 begins rotating, it turns sprocket 200 which moves chain 199. Rotation of the chain 199 rotates sprocket 198 on shaft 195, causing the pinion gears 194 to turn with the shaft 195. The rotating pinion gears engage racks 192 and 193, pushing the racks and load-supporting floor 190 rearwardly in direction 158, the floor 190 rolling smoothly rearward on bearings 184. When the motor 202 is energized in the forward direction the load-supporting floor is pulled back into the trailer 182 by the rotating pinion gears 194. As the elongated members 25 and 27 move fore and aft in response to rotation of the pinion gears the elongated slots 176 and 178 move forwardly and rearwardly relative to the shaft 195. The switch 214 is normally in closed position 201 and opens only when load-supporting floor 190 is in its most extreme rearward position 177. The operator retains the switch 206 at position 208 until the floor 190 reaches its rearmost position 177, at which point the contact switch 214 is swung to open position 215, causing the motor 202 to turn off. The load-supporting floor 190 is then extending rearwardly out of the cargo entrance 20 of the truck trailer 182 a distance of approximately 4 feet, to define a loading deck usable by the operator. The conveyor belt 68 may now be moved forwardly and rearwardly in accord with the operation already described in conjunction with embodiment 10 to load or unload cargo. The loading bar 94 may be moved between raised and lowered positions 99 and 100 by control lever 104 and bleed valve 81, the cylinders for moving the bar 94 being positioned behind the bar and within the load-supporting floor 190 and the controls being substantially identical to those described for the bar 94 of FIG. 4.

When the load-supporting floor 190 is to be rolled back within the truck 182, the operator swings the switch 206 to position 210, causing the electric motor 202 to be operated in a forward direction rotating the shaft 195 and turning pinion gears 194. Rotation of the gears 194 pulls the racks 192 and 193 in a forward direction 166, carrying the load-supporting floor 190 to its original forward position 203 within the trailer 182. The floor 190 moves in a forward direction toward the front wall 213 until the cutoff switch 212 is contacted, causing the switch 212 to move to open position 205 and the motor 202 is de-energized. The operator then closes the rear door 218 and proceeds to his next delivery point.

Figure 8:
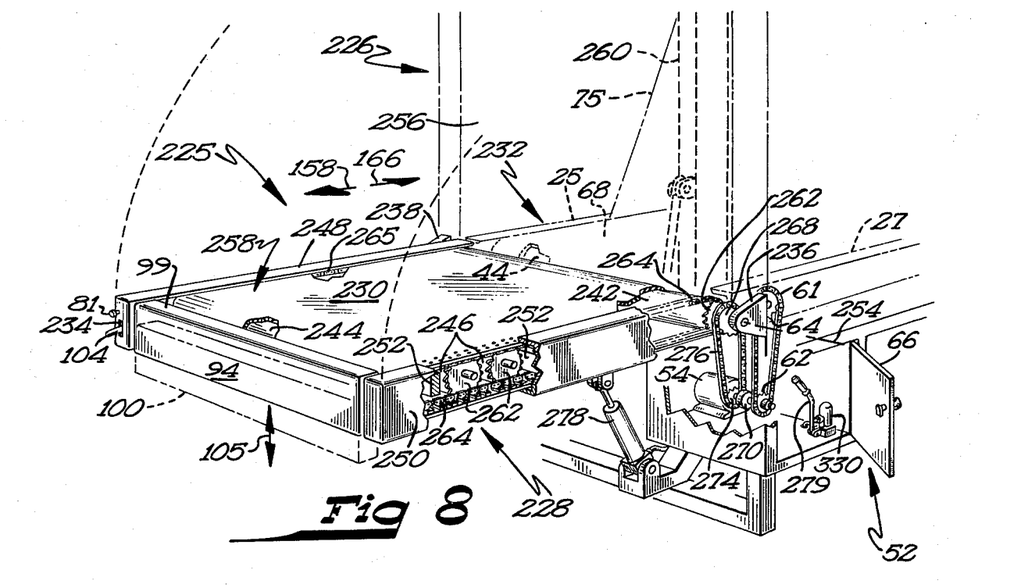
FIG. 8 is a perspective view of a tailgate utilizing the invention and usable with a local delivery type of truck trailer to define a loading deck at the rear of the trailer.

A third embodiment 225 is shown in FIG. 8, where truck 226 is provided with a swingably mounted tailgate 228 which is provided with a movably mounted conveyor belt 230.

The truck 226 is provided with a load-supporting floor 232 substantially identical in construction to that already described for earlier embodiments 10 and 180 and having the components already identified. It should be noted that the loading bar 94 ordinarily positioned at the rear of the conveyor belt 64 is instead positioned at the rearmost end of the tailgate 228. By separating the conveyor belt 68 of load-supporting floor 232 from the conveyor belt 230 of tailgate 228, rain or other precipitation accumulating on the tailgate 228 will not enter the trailer 226 and wet the cargo.

The tailgate 228 has a forward roller 242 and a rearward roller 244 and a plurality of identical rollers positioned therebetween and identified as 246. All of the described rollers 242, 244 and 246 are substantially parallel and are rotatably mounted between the lateral and rearwardly extending beams 248 and 250. A plurality of struts 252 extend between the beams 248 and 250 to provide structural support.

The bar 94 (FIG. 8) is mounted to the beams 248 and 250 for movement in upward and downward directions 105 and may be mounted substantially identically as was described for loading bar 94 in FIG. 4, and is provided with hydraulic or pneumatic cylinders to move the bar between raised position 99 and lowered position 100 to control the tipping of cargo as was described for the bar 94 of FIG. 4. An operating handle 104 extends from slot 234 and may be actuated to raise bar 94. A bleed valve 81 may be actuated to lower the bar 94 as already described in conjunction with FIG. 4.

The front roller 242 of the tailgate 228 is pivotally attached to the mounts 238 and 236 of elongated members 25 and 27, respectively, for swinging of the tailgate 228 about a horizontal axis 254, permitting the tailgate 228 to be swung between a raised position 260, where it confronts and blocks the entrance 256, and a lowered position 258 in which it defines a horizontal loading deck on which an operator can stand while manipulating cargo from the interior of the trailer. The tailgate 228 may be angled downwardly or upwardly to define a ramp to or from an adjacent loading dock.

A conveyor belt 230 made of substantially the same material as that described for the conveyor belt 68 within the trailer 226 is mounted on the rollers for rotation therewith and is supported on the rollers.

Each of the rollers 242, 244 and 246 is provided with sprockets 262 at both ends of the rollers, and endless chains 264 and 265 extend between front and rear rollers 242 and 244, engaging the sprockets on these rollers and also the sprockets on the rollers 246 positioned therebetween. Accordingly, rotation of the chains 264 and 265 causes forward or rearward rotation of the described rollers of the tailgate 228.

The conveyor belt 230 is rigidly fixed to the endless chains 264 and 265 by riveting or the like along the lateral edges of the conveyor belt, thereby causing the conveyor belt 230 to be positively driven in forward or rearward directions 166 or 158, respectively, in response to movement of the chains 264 and 265.

The front roller 242 is provided with both the described sprockets 262 and a drive sprocket 268 fixed to the shaft of the roller 242 to rotate therewith. The reversible electric motor 54 is positioned beneath the truck body 226 in the drive box 52 and is connected with a sprocket 274 through clutch 270. An endless chain 276 extends between sprockets 268 and 274, permitting forward or rearward rotation of the motor 54 to be transmitted to the roller 242 to thereby drive the conveyor belt 230 with chains 264 and 265.

Referring to FIG. 8, the clutch 270 is constructed to be electrically operated and to permit the operator to connect sprocket 62 to motor 54, to connect sprocket 274 to motor 54, or alternatively to connect simultaneously both sprockets 62 and 274 to the motor 54. Accordingly the clutch permits the operator to use a single motor to drive the conveyor belt 68, the conveyor belt 230 or alternatively to drive both conveyor belts 64 and 230 simultaneously.

To raise and lower the tailgate 228 between positions 260 and 258, an hydraulic cylinder 278 is pivotally mounted to the tailgate 228 and to the frame of the truck trailer and is actuated by the lever 279 and an associated bleed valve associated with master cylinder 330. While the rearwardly extending tailgate 228, as shown, would provide approximately four feet of loading deck space for an operator, it should be understood that, if desired, the tailgate may be of sufficient length to define a door for completely closing the rear entrance of the trailer 226 and is within the purview of the invention.

In operation, the load-conveying floor 232 within the trailer 226 operates exactly as already described for earlier embodiments aside from the already described necessity of actuating clutch 270 to provide the desired mode of driving. The operator may use clutch 270 to drive only belt 68, only belt 230 or both simultaneously. The clutch 270, sprocket 274, chain 276, sprockets 262 and chains 264 and 265 collectively comprise a tailgate drive means for selectively moving the tailgate conveyor belt 230.

During road travel the tailgate 228 is generally raised to an upright position 260. When loading or unloading is to be done, the operator actuates the bleed valve associated with cylinder 330, causing the cylinder 278 to lower the tailgate 228 to the lowered position 258. If a loading deck is required for the operator to stand on during unloading, the tailgate 228 is left in the shown horizontal position 258 to define a generally horizontal, rearwardly extending loading deck on which the operator may stand while he selects cargo to be unloaded.

When cargo within the trailer is to be unloaded, the operator engages clutch 270 to operate conveyor belt 68 and then uses switch 115 to actuate the load-supporting floor 232 to move the cargo rearwardly until it contacts the conveyor belt 230. The operator actuates the clutch to drive both conveyor 68 and belt 230 and then again energizes the motor 54 to drive the conveyor belts 230 and 64 in a rearward direction 158. As the motor 54 is energized, the sprocket 274 begins rotating and transfers its rotation to the chain 276 which rotates sprocket 268 on front roller 242. Roller 242, accordingly, begins rotation and transfers its rotation by chains 264 and 265 to rollers 246 and 244. Movement of the chains 264 and 265 carries the conveyor belt 230 in the rearward direction 158 and moves the cargo thereon rearwardly toward the loading bar 94. The loading bar 94 may be moved upwardly or downwardly to load or unload the cargo in the most expeditious manner, as already described, and will not be described further.

To load cargo onto the van, the cargo is urged onto the rearward portion of the conveyor belt 230 and the motor 54 energized in a forward direction with clutch 270 set to move the conveyor belt 230 in direction 166. Because the reverse operation of the rollers 242, 244 and 246, chains 264 and 265 and belt 230 is substantially similar to that already described in conjunction with movement of belt in reverse direction 158, further explanation is unnecessary. When the cargo reaches the rearmost roller 44 of the load-supporting floor 232 within the trailer 226, the load-supporting floor 232 may be energized to carry the load further within the trailer. After loading has been completed, the operator again actuates the lever 279 to cause cylinder 278 to swing the tailgate 228 to its raised position 260 where it is ready for travel.

Accordingly, the tailgate 228 provides a structure usable on local delivery type trucks where a loading deck is necessary. Its structure permits the operator to bring it to a horizontal position 258 so that the entire load within the truck may be easily unloaded even where a standard freight terminal dock is unavailable.

While the preferred embodiments of the present invention have been described, it should be understood that various changes, adaptations and modifications may be made therein without departing from the spirit of the invention and the scope of the appended claims.

What is claimed is:

1. In combination with a truck trailer having a pair of upright, lateral, generally parallel sidewalls extending fore and aft along said trailer and a cargo loading entrance at the rear of said trailer, a cargo moving apparatus compatible with wheeled loading vehicles and usable with a power source comprising:
   a pair of rigid, elongated members spaced from one another and generally parallel to each other and to said sidewalls;
   a multiplicity of rigid, elongated, combined drive and support rollers rotatably mounted to and along the entire length of said pair of members for rotation about the longitudinal axes of said rollers, said rollers having their longitudinal axes parallel to one another, perpendicular to said pair of elongated members, and said longitudinal axes being substantially within a common plane;
   a conveyor belt supported by said multiplicity of rollers and mounted on said rollers for movement in fore and aft directions along said trailer in response to rotation of said plurality of rollers, said conveyor belt, said pair of elongated members and said multiplicity of rollers defining a movable load-supporting floor for said trailer on which wheeled vehicles can enter and leave the trailer; and
   drive means energizable from the power source and operatively, drivingly connected with said conveyor belt and with said multiplicity of said rollers of said load-supporting floor to positively drive said rollers and move said conveyor belt in fore and aft directions on said rollers to carry cargo along said truck trailer.

2. The combination according to claim 1, wherein said drive means includes a multiplicity of sprockets, a sprocket being fixed to at least one end of each of said rollers to rotate each said roller in response to sprocket rotation, and further includes an endless chain drivingly engaging said multiplicity of sprockets to simultaneously rotate all said sprockets, thereby positively rotating each said roller in response to movement of said chain.

3. The combination according to claim 2 wherein said endless chain is rigidly fixed to said conveyor belt to positively drive said belt in response to movement of said chain.

4. The combination according to claim 1 wherein said drive means includes a multiplicity of sprockets, said sprockets being fixed to each end of each roller to rotate the roller in response to sprocket rotation, and further includes a pair of endless chains, one said chain drivingly engaging the sprockets at one end of said rollers and the remaining chain drivingly engaging the sprockets at the remaining end of said rollers to simultaneously positively rotate all said rollers in response to movement of said pair of chains.

5. The combination according to claim 4 wherein each of said endless chains is rigidly fixed to said conveyor belt to positively drive said belt in response to movement of said chains.

6. The combination according to claim 1 wherein:
   said load-supporting floor is movably mounted to said trailer for fore and aft wholly horizontal movement relative to said trailer to move a predetermined length of said load-supporting floor in and out of the cargo entrance of said trailer to provide a loading deck extending rearwardly from said trailer; and
   means for selectively moving said load-supporting floor rearwardly outwardly through said cargo entrance and returning said load-supporting floor within said trailer.

7. The combination according to claim 1, and further including:
   a generally upright, rigid barrier carried by and supported on said load-supporting floor and extending upwardly therefrom and stationary relative to said conveyor belt to move solely in response to movement of said load-supporting floor between a forward position adjacent the front of the trailer and a rear position adjacent the rear of the trailer and being generally perpendicular to said sidewalls and extending therebetween to provide support to cargo adjacent said barrier; and
   guide means extending between said barrier and said sidewalls and permitting free rolling movement of said barrier relative to said sidewalls to guide said barrier fore and aft in response to movement of said conveyor belt.

8. The combination according to claim 7 and further including a first electrical switch means positioned adjacent said barrier at the front end of said trailer to contact and be actuated by said rigid barrier when said barrier has substantially reached its forward position and operatively electrically connected to said drive means to de-energize said drive means in response to contacting said barrier.

9. The combination according to claim 7 and further including second electrical switch means positioned at the rear end of said trailer adjacent said barrier to contact and be actuated by said upright barrier when said barrier has substantially reached its rear position and operatively electrically connected to said drive means to de-energize said drive means in response to contacting of said barrier.

10. The combination according to claim 9 wherein said multiplicity of rigid, elongated rollers are of equal diameter and are closely spaced with the distance between adjacent rollers not exceeding 1 inch.

11. The combination according to claim 1 wherein said apparatus further includes a tailgate swingably mounted across said cargo loading entrance of said trailer for upward and downward swinging movement about a horizontal tailgate axis, said tailgate including:
- a tailgate conveyor belt movably mounted on said tailgate and adjacent and confronting said load-supporting floor of said trailer to receive cargo from and deliver cargo to said load supporting floor;
- tailgate drive means connectable to the power source to selectively move said tailgate conveyor belt in fore and aft directions;
- a lifting mechanism connected between said tailgate and said trailer to swing said tailgate about said gate axis;
- a pair of beams positioned along lateral sides of said tailgate;
- a loading bar adjacent said tailgate conveyor belt, adjacent the rear ends of said beams and extending between said beams and movably mounted to said beams for upward and downward movement between said beams when said tailgate is in a rearwardly extending position; and
- a loading bar lifting device to selectively raise and lower said loading bar relative to said beams in order to selectively engage cargo carried on said tailgate conveyor belt and control the tipping of the cargo as it is unloaded from said tailgate.

12. The combination according to claim 1 wherein said multiplicity of rigid, elongated rollers are of equal diameter and are closely spaced with the distance between adjacent rollers not exceeding one inch.

13. The combination according to claim 1 wherein said conveyor belt extends substantially halfway around the outer circumference of said multiplicity of rollers.

* * * * *